(12) United States Patent
Camacho Perez et al.

(10) Patent No.: US 10,270,271 B2
(45) Date of Patent: Apr. 23, 2019

(54) ENERGY HARVESTING FABRIC

(71) Applicant: Intel Corporation, Santa Clara, CA (US)

(72) Inventors: Jose R. Camacho Perez, Guadalajara (MX); Hector A. Cordourier Maruri, Guadalajara (MX); Paulo Lopez Meyer, Tlaquepaque (MX); Julio C. Zamora Esquivel, Zapopan (MX); Jason A. Mix, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/640,409

(22) Filed: Jun. 30, 2017

(65) Prior Publication Data

US 2019/0006863 A1    Jan. 3, 2019

(51) Int. Cl.
| | | |
|---|---|---|
| *H01L 41/04* | (2006.01) | |
| *G01J 1/04* | (2006.01) | |
| *B32B 15/14* | (2006.01) | |
| *H02J 1/00* | (2006.01) | |
| *H02J 7/00* | (2006.01) | |
| *H02N 1/04* | (2006.01) | |
| *A41D 31/00* | (2019.01) | |

(52) U.S. Cl.
CPC ........ *H02J 7/0052* (2013.01); *A41D 31/0066* (2013.01); *G01J 1/04* (2013.01); *H01L 41/04* (2013.01); *H02N 1/04* (2013.01); *B32B 15/14* (2013.01); *H02J 2007/006* (2013.01)

(58) Field of Classification Search
CPC ........... G01J 1/04; B32B 15/14; D03D 15/00; D03D 1/0088

USPC ............... 307/80, 82, 66, 64, 149, 104, 109; 600/301, 345; 427/58, 256
See application file for complete search history.

(56) References Cited

U.S. PATENT DOCUMENTS

| | | | | |
|---|---|---|---|---|
| 2008/0233822 A1* | 9/2008 | Swallow | .............. | D03D 1/0088 442/185 |
| 2011/0281488 A1* | 11/2011 | Li | ............................. | B32B 5/28 442/378 |
| 2011/0284729 A1* | 11/2011 | Abouraddy | ............... | G01J 1/04 250/227.11 |
| 2013/0144131 A1* | 6/2013 | Wang | .................... | A61B 5/1477 600/301 |
| 2014/0247478 A1* | 9/2014 | Bates | ........................ | F41H 3/02 359/350 |
| 2015/0126834 A1* | 5/2015 | Wang et al. | ......... | A61B 5/6833 600/345 |
| 2016/0258110 A1* | 9/2016 | Alamer | ............. | D06M 15/3562 |
| 2017/0348156 A1* | 12/2017 | Duesterhoft | ........ | A61F 13/0273 |

* cited by examiner

*Primary Examiner* — Fritz M Fleming
*Assistant Examiner* — Jagdeep S Dhillon
(74) *Attorney, Agent, or Firm* — International IP Law Group, P.L.L.C.

(57) ABSTRACT

The apparatus includes an apparatus for harvesting energy. The apparatus includes a textile having an insulating substrate, a direct current (DC) power bus structure disposed in the insulating substrate, and multiple transducers. The DC power bus includes a positive conductor and a ground conductor. The transducers are secured to the insulating substrate and in electrical contact with the positive conductor and the ground conductor. Additionally, the DC bus remains conductively coupled to the transducers remaining in the textile after the textile is cut.

20 Claims, 10 Drawing Sheets

— — — POSITIVE POWER LINES 310

- - - - - NEGATIVE POWER LINES 312

——— POSITIVE POWER LINES 510

- - - - - - NEGATIVE POWER LINES 512

ENERGY HARVESTING FABRIC

BACKGROUND

Energy harvesting involves collecting a form of energy, such as solar or thermal energy, and converting the collected energy into electricity. Energy may be harvested using transducers, which may include photovoltaic (PV) panels for solar energy, and thermoelectric generators for thermal. However, increasing the amount of energy harvested by transducers is challenging.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Transducers are devices that may be used to harvest energy in a localized environment, referred to herein as ambient energy. A transducer collects ambient energy and converts that energy into direct current electricity. There are transducers for light, heat, motion, electromagnetic waves, and the like. Light, heat, motion, and electromagnetic waves may be harvested using, respectively, photovoltaic panels, thermoelectric generators, piezoelectric materials, and rectennas. In this description, rectennas are used as an example of a transducer, but the invention can be applied to other types of transducers. A rectenna may have an antenna, a rectifying diode and a filter. The diode rectifies the AC current induced in the antenna by the EM energy, to produce DC current that can be delivered to a load. A load is part of an electrical circuit that consumes the energy passing over the circuit, and returns the depleted current to the circuit.

For clarity, an ambient space is described herein with respect to a local environmental space surrounding a transducer. For example, a rectenna located within a wirelessly-connected office space may harvest ambient electromagnetic energy within the range of the rectenna. A wirelessly connected office space may be connected to the Internet by electromagnetic waves that physically travel between wireless routers and a computer device in the office. The office space may additionally include wireless peripherals, such as keyboards, mice, printers, and portable computing devices. These peripherals may use light and radio waves to communicate with a desktop computer to perform their various functions, such as typing, moving a cursor on a computer screen, printing, or sharing files.

While there may be many wirelessly connected devices in an example office space, even collecting all available electromagnetic energy may not be enough to usefully power electronic devices. However, as electronic devices become more energy efficient, and transducers become more efficient at converting ambient energy into electricity, it may be possible to harvest enough energy to usefully power electronic devices.

Current textile-based energy harvesting systems may be developed ad-hoc, i.e., for a single type of application, such as the fabric for a jacket. That is, for every new textile design, such as the upholstery for a chair, the designer specifically designs the new textile to integrate energy harvesting elements. Additionally, developing a new design for each fabric may result in re-engineering the energy harvesting elements, or re-engineering the integration of the rectenna with the fabric, for each kind of textile, e.g., the textile for a coat, or the textile for upholstery. Further, integrating energy harvesting elements for different kinds of textiles may be expensive because such integration may not be accomplished effectively without the technical know-how of an energy harvesting specialist.

Accordingly, energy harvesting fabrics described herein may enable fashion and interior designers to integrate energy harvesting features into their designs without technical expertise in energy harvesting. Additionally, example energy harvesting fabrics may be used for various kinds of products, such as clothing, carpeting, rugs, curtains, furniture upholstery, and the like. Further, example energy harvesting fabrics may be used in these ways without re-engineering the energy harvesting elements or re-designing how these elements are integrated into the fabric.

Figure 1:
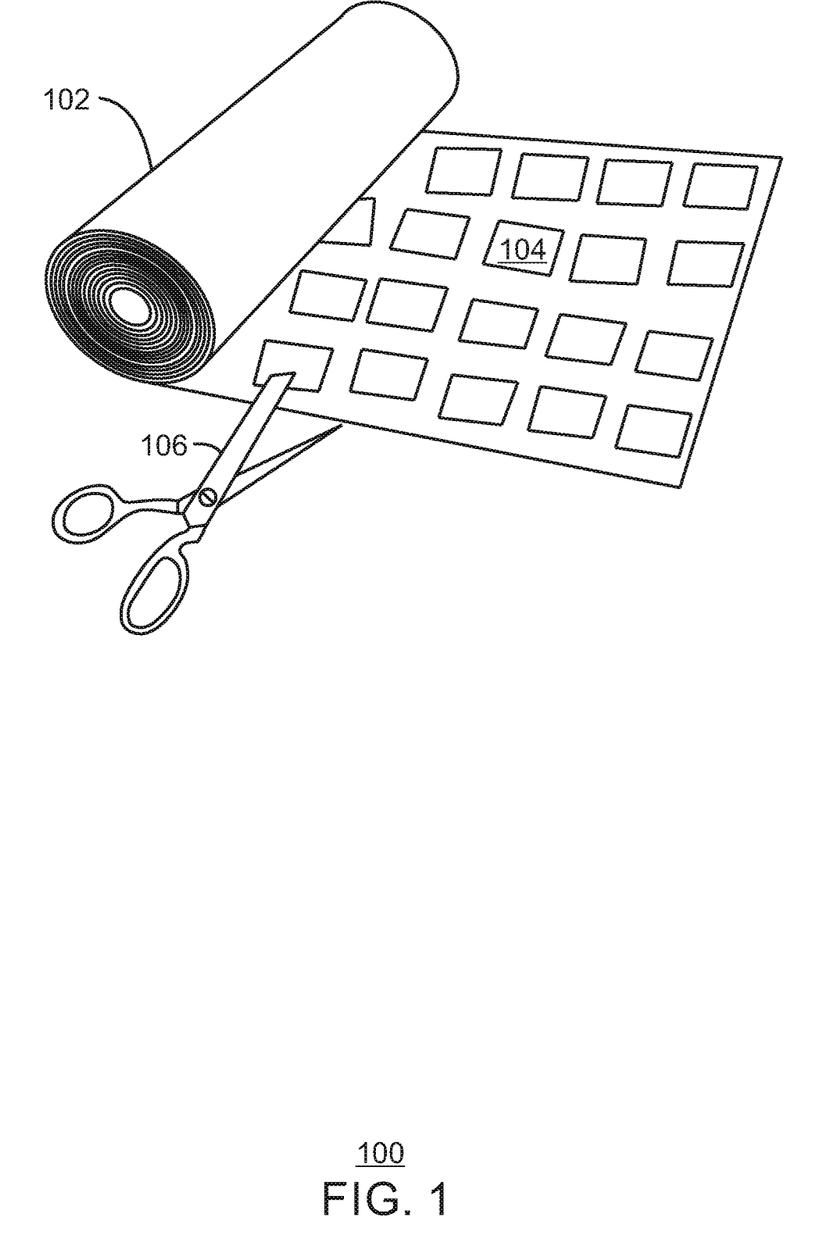
FIG. 1 is a diagram of an example roll of energy-harvesting fabric.
Figure 2A:
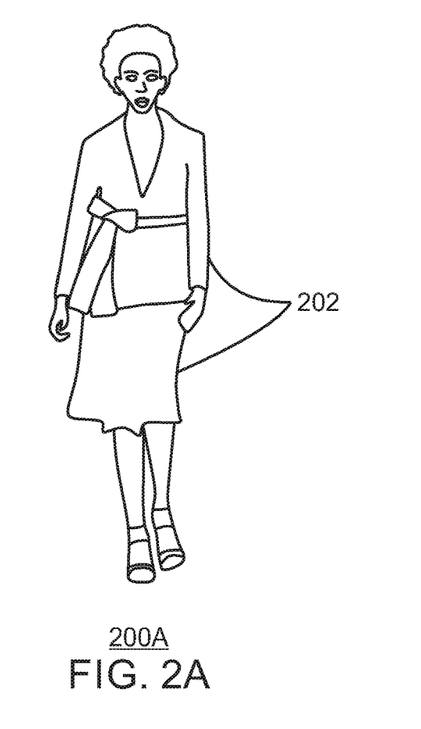
FIG. 2A is a diagram of an example item made with an energy-harvesting fabric.
Figure 2B:
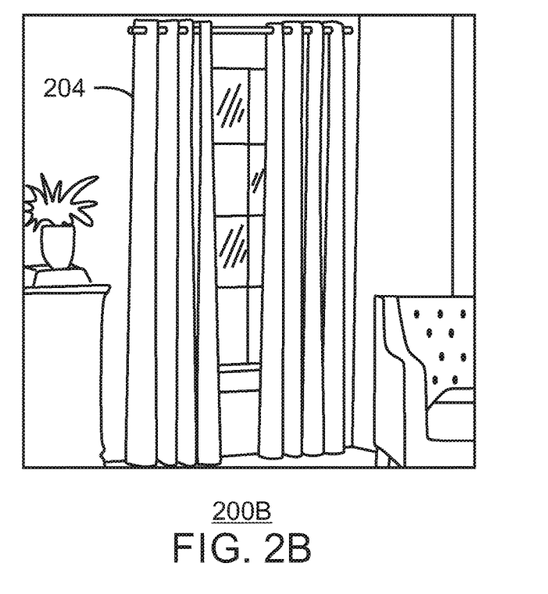
FIG. 2B is a diagram of an example item made with an energy-harvesting fabric.
Figure 2C:
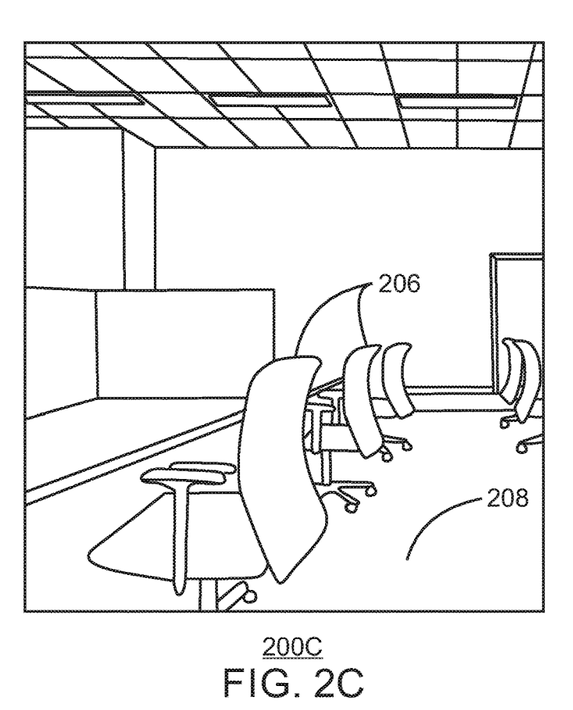
FIG. 2C is a diagram of an example item made with an energy-harvesting fabric.
Figure 2D:
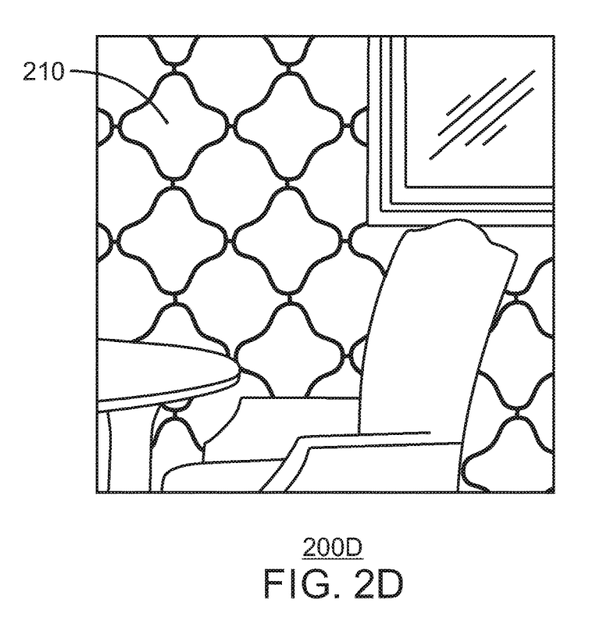
FIG. 2D is a diagram of an example item made with an energy-harvesting fabric.

FIG. 1 is a diagram of an example roll 102 of energy-harvesting fabric. The roll 102 is useful for harvesting energy. The roll 102 includes multiple rectennas 104 arranged in an example rectenna array. A rectenna is a rectifying antenna used to convert electromagnetic energy into DC electricity. Because electromagnetic energy is distributed in space, energy harvesting techniques may use rectenna arrays to increase the range over which energy may be harvested by a single fabric, and the amount of energy harvested. Rectenna arrays may be groups of rectennas 104, physically disposed in proximity with, and electrically connected with, each other. In examples, the roll 102 may be cut with a scissors 106, for example, according to a pattern for a clothing item, e.g., the jacket. Even though the cut may sever electrical connectivity between multiple rectennas 104, the fabric used for the finished coat may still include one or more intact rectennas 104 with intact electrical connections. As such, the jacket made with example energy-harvesting rolls 102 of fabric, may still be able to harvest ambient energy. As stated previously, example energy harvesting fabrics may be used for various kinds of products, such as clothing, carpeting, rugs, curtains, furniture upholstery, and the like.

FIGS. 2A-2D are diagrams of example items made with energy-harvesting fabrics. The example items include a skirt and blouse 202 being worn, drapes 204 hanging in a living room window, the upholstery 206 on chairs and the carpeting 208 in an office, and a wall covering 210 in a study. Each of these items 202, 204, 206, 208, 210 may be used for a different type of fabric, and may harvest energy in their associated environments.

In example embodiments, the energy-harvesting fabric of the skirt and blouse 202 may harvest energy as the woman moves among different environments throughout a day. The drapes 204 may harvest infrared energy from wireless remote devices in the living room. Further, one side of the drapes 204 may include photovoltaic panels to harvest light energy from the sun. The upholstery 206 and carpeting 208 may harvest the electromagnetic energy of an office environment, such as the electromagnetic signals passed between the various computers, wireless mice and keyboards, printers, and other peripheral devices. The upholstery 206 and carpeting 208 may additionally harvest energy from the lights in an office. In some examples, the carpeting 208 may also capture motion energy from foot traffic on the carpeting 208. Each of these items 202, 204, 206, 208, 210 may include transducer arrays that are electrically connected with each other over a direct current bus (not shown).

Figure 3A:
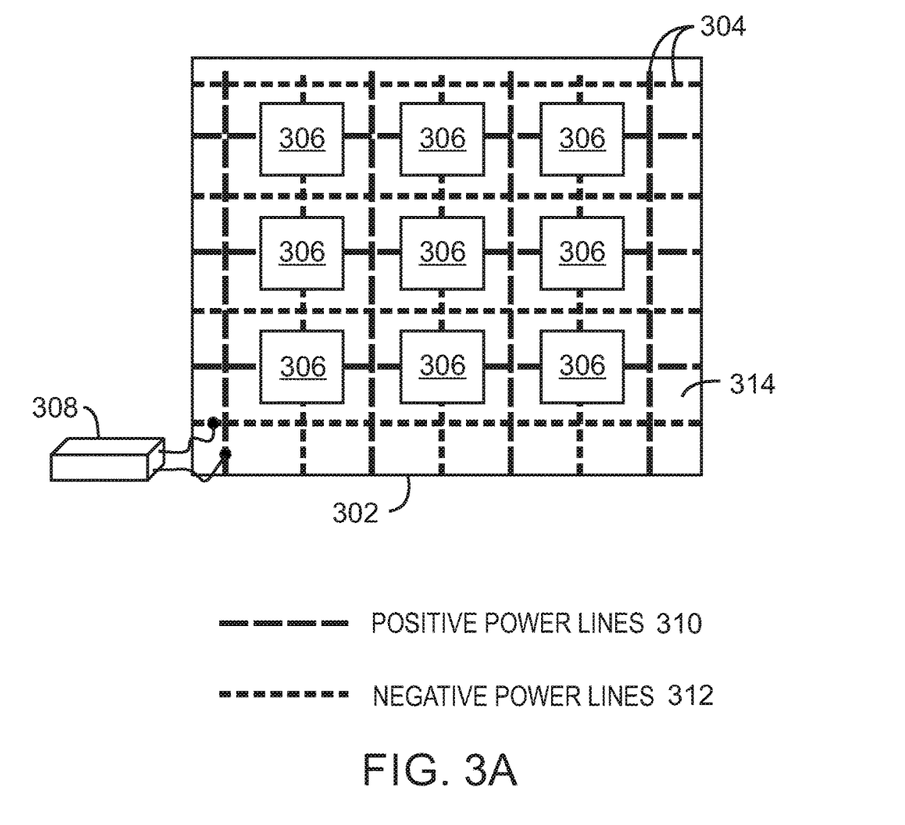
FIG. 3A is a top-view perspective of an example energy-harvesting fabric.

FIG. 3A is a top-view perspective of an example energy-harvesting fabric 302. The energy-harvesting fabric 302 includes a direct current power bus 304 that provides an electrical circuit for passing electric current between the transducers 306 and an electric load 308. The direct current power bus 304 includes positive power lines 310 and negative power lines 312. The negative powerlines 312 are also referred to herein as ground lines. The load 308 is electrically connected to the direct current power bus 304, and consumes the direct current generated by the transducers 306. The load 308 may be an electronic device that consumes the harvested energy for the device's operation, a battery that stores the harvested energy for later use, and the like.

The power bus includes positive power lines woven into a first fabric layer and negative power lines woven into a second power layer and insulated from the first power lines. The positive power lines form an interconnected grid throughout the fabric. Similarly, the negative power lines also form an interconnected grid throughout the fabric. Each rectenna is coupled to the load through the positive and negative power lines. By arranging the positive power lines and the negative power lines in a grid formation, each rectenna has several redundant conductive paths to the load.

The transducers 306 may be arranged on the fabric in a grid pattern where the transducers 306 are evenly spaced with respect to each other. In this way, each transducer 306 has access to the direct current power bus 304. The power lines 310, 312 may be woven into an insulating substrate 314, made from thread that is electrically conductive. In this way, the direct current power bus 304 conducts current from the transducers 306 to the load 308 In some examples, the conductive threads and the insulating substrate 314 may be manufactured with flexible or rigid materials.

For clarity, this description makes specific reference to the horizontal and vertical directions of the power lines 310, 312, of the bus 304. Examples may include power lines 310, 312 of various configurations, such as a configuration where the horizontal and vertical references described above are reversed. In other examples, power lines 310, 312 run in varying directions and thus are not limited to the horizontal and vertical directions of this example. Further, while this example arranges the transducers in a grid pattern, other patterns are possible.

Figure 3B:
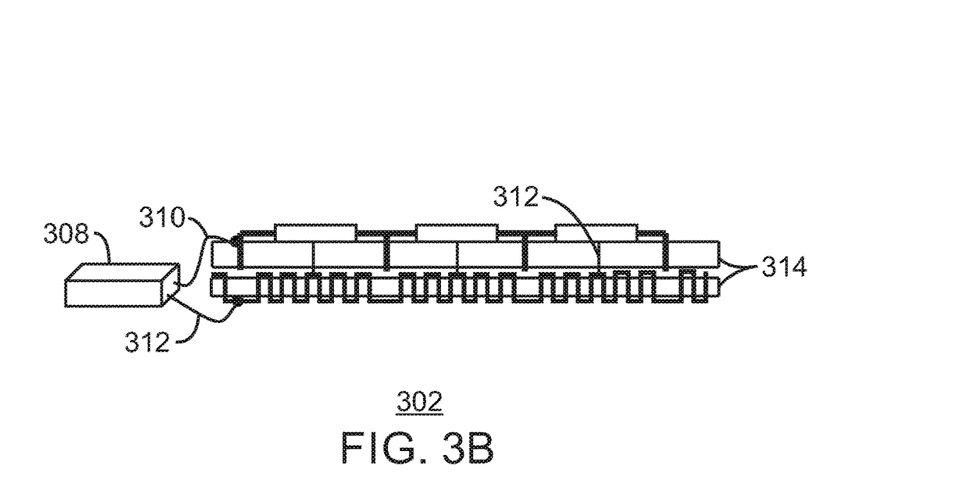
FIG. 3B is a side-view perspective of the example energy-harvesting fabric.

FIG. 3B is a side-view perspective of the example energy-harvesting fabric 302. The power lines 310, 312 may be placed in contact with the load 308. In examples, the load 308 may be in electrical contact at any position of the direct current power bus 304, and maintain the ability to consume energy harvested by the transducers 306. The power lines 310, 312 are woven into top and bottom layers of the insulating fabric 314. This perspective shows an example weave of the positive power lines 310 running in the horizontal direction in the top layer of the insulating substrate 314. Additionally, this perspective shows positive power lines 310 and negative power lines 312 woven into the bottom layer of the insulating fabric 314. From the side perspective, the power lines 310, 312 on the bottom layer appear thin because they represent a view from the side on. The positive power lines 310 and negative power lines 312 appear to alternate in the bottom layer just as the power lines 310, 312 alternate in the top layer if viewed from the perspective perpendicular to the perspective shown in FIG. 3B. Thus, depending on the view from which the energy-harvesting fabric 302 is viewed either the top or bottom layer may show an edge-on view of alternating power lines 310, 312, while the other layer may show a weave pattern of the power line shown.

In examples, the direct current power bus is disposed within the energy-harvesting fabric 302 such that, regardless of where the energy-harvesting fabric 302 is cut, there is still an intact direct current power bus structure 304 in electrical contact with the transducers 306 in the remaining fabric segment(s). Thus, an array of rectennas, PV panels, or thermoelectric generators, for example, connected to the direct current power bus 304 may be able to harvest energy from radio waves, light waves, or thermal energy, even if the cut is an arbitrary size, shape, or pattern, and provide the harvested energy to whatever load 308 is electrically connected with the direct current power bus 304.

Figure 4:
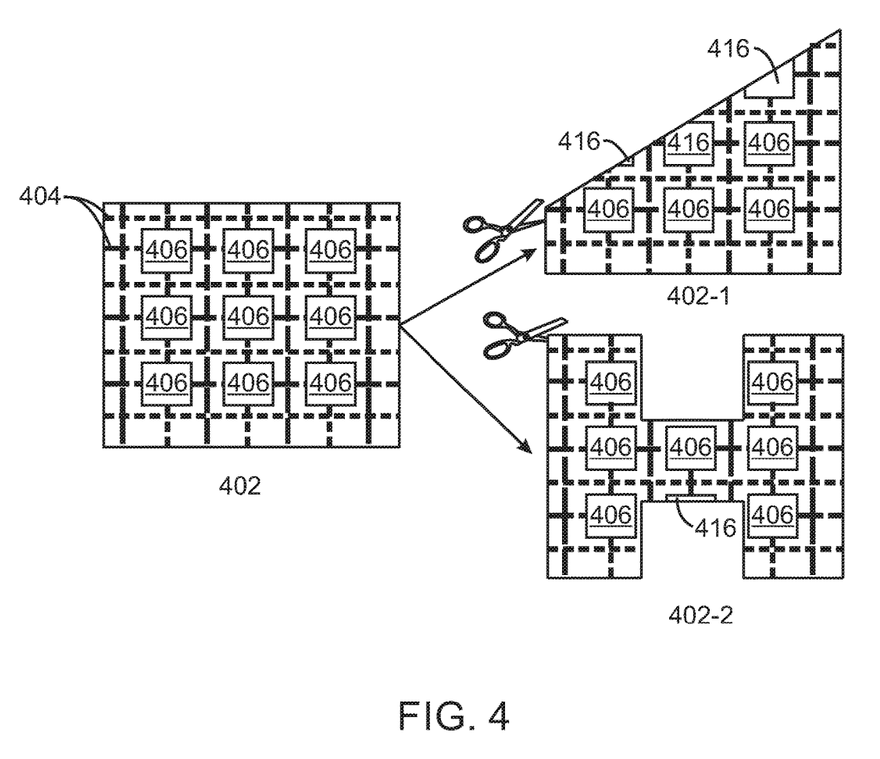
FIG. 4 is a diagram of an example energy-harvesting fabric, and alternative energy-harvesting fabrics that may be cut from the energy-harvesting fabric.

FIG. 4 is a diagram of an example energy-harvesting fabric 402, and alternative energy-harvesting fabrics 402-1, 402-2 that may be cut from the energy-harvesting fabric 402. The example energy-harvesting fabrics 402-1, 402-2 are possible cuts of the energy-harvesting fabric 402 that maintain the ability to provide harvested energy to an electrically connected load, such as the load 308.

The amount of energy harvested may depend on the size to which the fabric is cut, e.g., the area of the energy-harvesting fabrics 402-1, 402-2. Energy-harvesting fabric 402-2 has greater area than energy-harvesting fabric 402-1. Additionally, the amount of energy that can potentially be harvested by cut energy fabrics, such as energy-harvesting fabrics 402-1, 402-2 may also depend upon the number of intact transducers 406 in electrical contact with the direct current power bus 404. Energy-harvesting fabric 402-1 has four intact transducers 406, and energy-harvesting fabric 402-2 has seven intact transducers 406. Thus, because energy-harvesting fabric 402-2 has a larger area than, and more intact transducers 406 than, energy-harvesting fabric 402-1, energy-harvesting fabric 402-2 may be capable of harvesting more energy than energy-harvesting fabric 402-1.

Additionally, the direct current power bus 404 is arranged such that electrical connections are available in cut fabrics regardless of size and shape, such as energy-harvesting fabrics 402-1, 402-2. The cut fabrics may damage the direct current power bus 404 and transducers 406 along the cut edges. These damaged transducers 416 may not be capable of harvesting energy. However, the transducers 406 are distributed in cut fabrics such that several transducers 406 remain available for energy harvesting. Furthermore, due to the redundancy provided by the positive and negative power grids, any undamaged transducers will still be able to conductive couple to the load through the remaining power lines.

In FIG. 4, example energy-harvesting fabrics 402-1, 402-2 include multiple intact transducers 406. However, as long as at least one intact transducer 406 remains, the cut fabric can still harvest energy from the ambient, and deliver the energy to a load.

Figure 5:
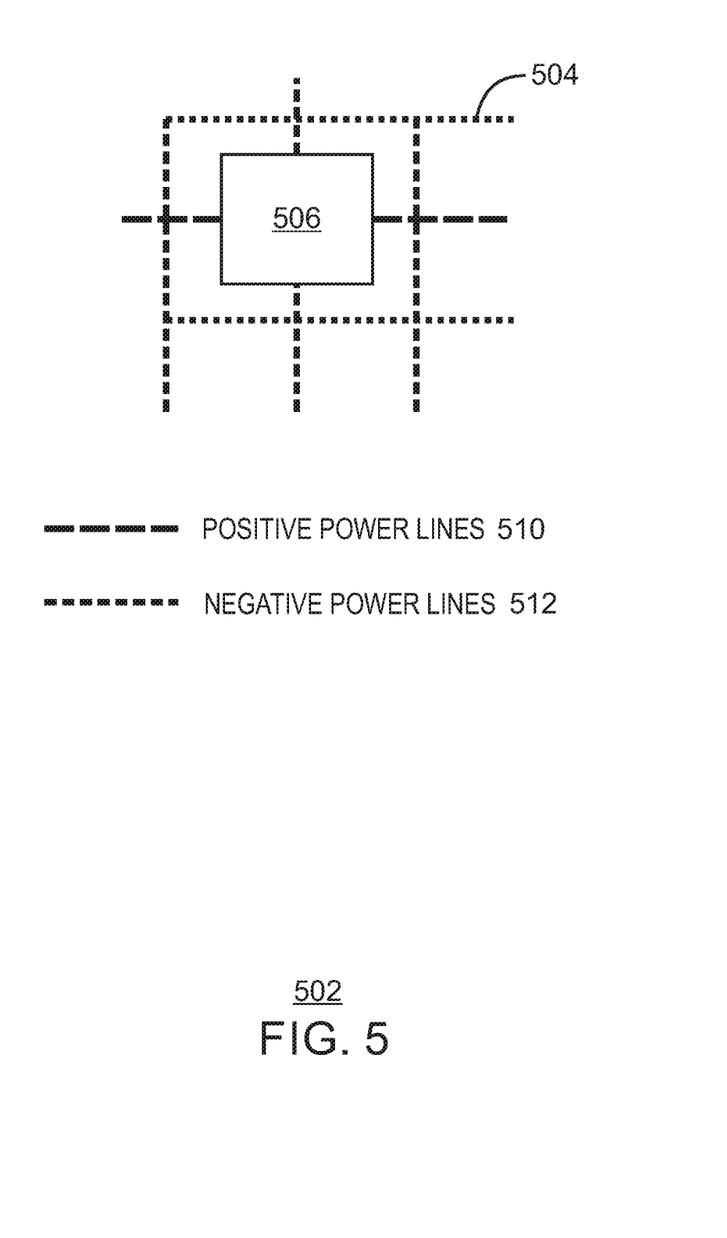
FIG. 5 is a diagram of an example fabric segment for harvesting energy.

FIG. 5 is a diagram of an example fabric segment 502 for harvesting energy. The example fabric segment 502 includes an intact direct current power bus 504, and an intact transducer 506. The intact transducer 506 is capable of harvesting energy from the ambient, and passing current from the harvested energy over the direct current power bus 504 to an electrically connected load, such as load 308.

Figure 6A:
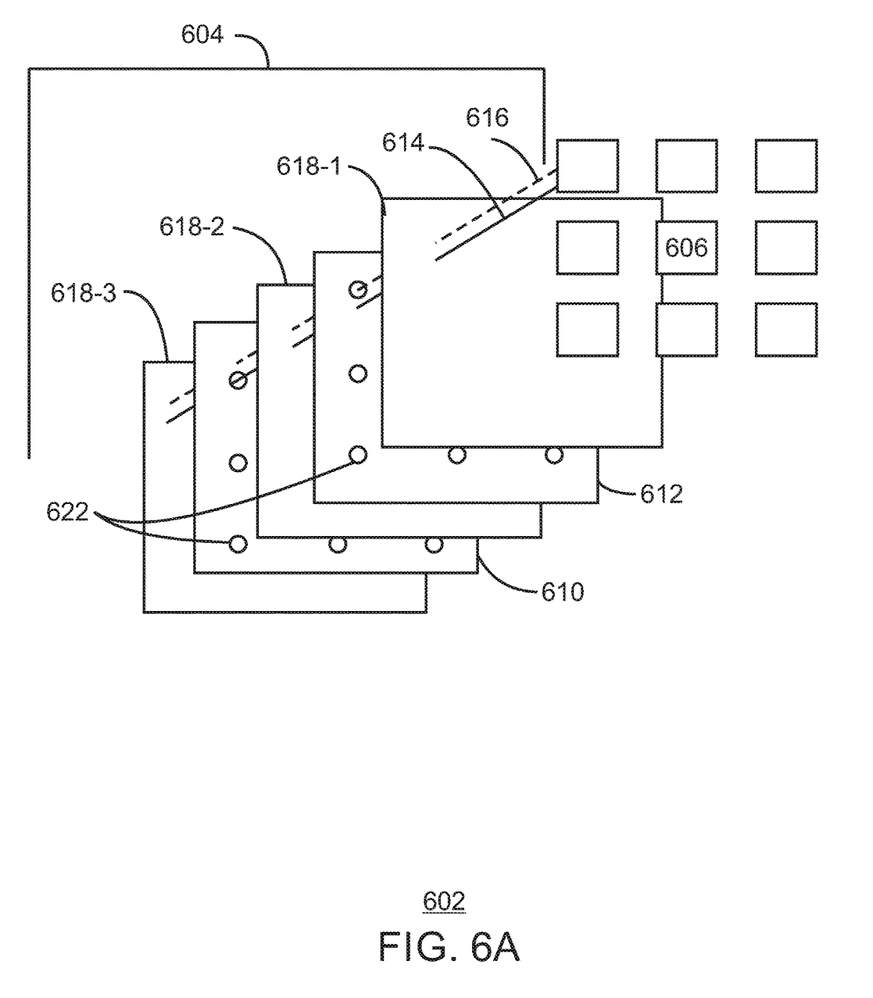
FIG. 6A is a top-view perspective of an example energy-harvesting fabric.

FIG. 6A is a top-view perspective of an example energy-harvesting fabric 602. The example energy-harvesting fabric 602 includes a direct current power bus 604, which includes a positive layer 610 and a negative or ground layer 612 (separated by an insulating fabric layer 618-2 and sandwiched between insulating fabric layers 618-1 and 618-3); and power lines 614, 616. The transducers 606 are secured to the insulating fabric layer 618-1. Power lines 610, 612 couple each of the transducers to the positive layer 610 and ground layer 612. In some examples, the power lines 614, 616 may be insulated to avoid a short circuit between them. The power layer 610 includes holes 620 that enable the negative power lines 616 to pass through the positive power layer 610 without contact. The ground layer 612 includes holes 622 that enable the positive power lines 614 to pass through the ground layer 612 without contact.

Figure 6B:
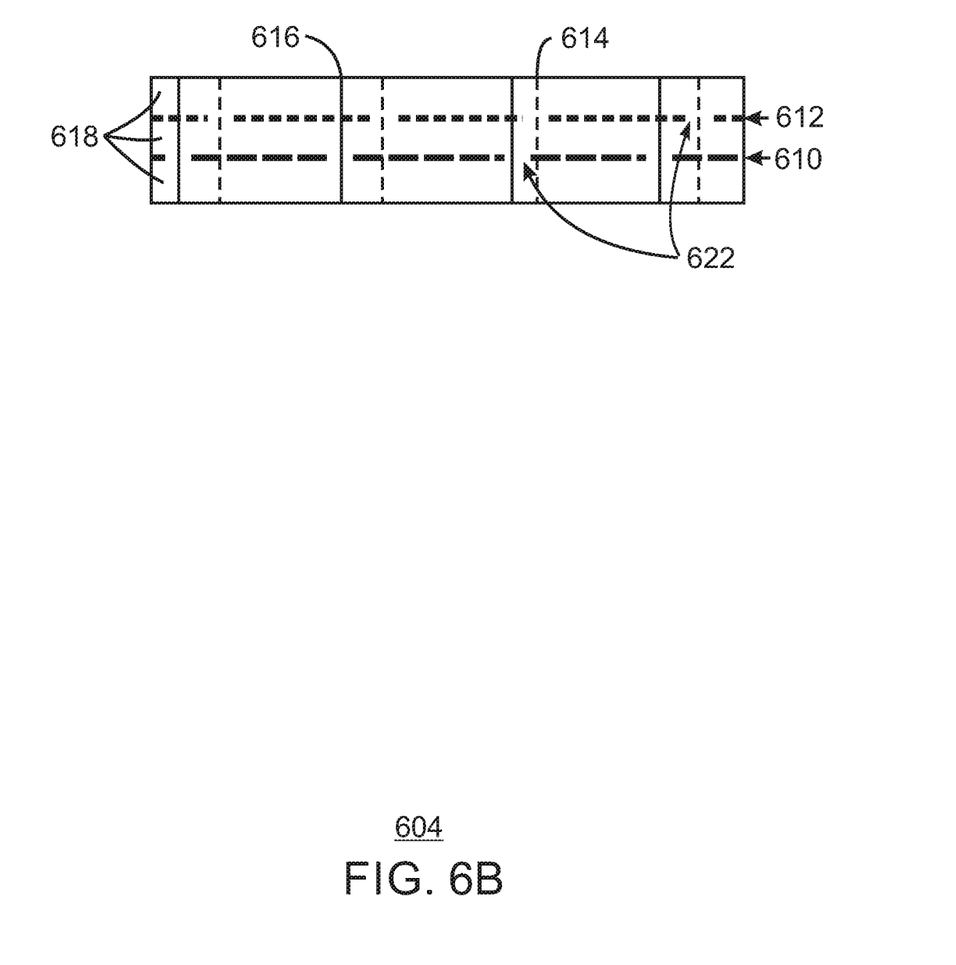
FIG. 6B is a side-view perspective of the example energy-harvesting fabric.

FIG. 6B is a side-view perspective of the energy harvesting fabric 602. The negative power line 616 makes electrical contact with the ground layer 612. Similarly, the positive power line 614 makes electrical contact with the positive layer 610. Additionally, the power lines 614, 616 pass through insulating holes 620, 622 in the positive and ground layers 610, 612. In some examples, the power lines 614, 616 are secured to insulating fabric on an opposing side of the energy-harvesting fabric 602.

The energy-harvesting fabric 602 may additionally include textile layers obscuring the view of the enclosed textile circuitry. Additional example layers may vary in design, look, and feel without constraints imposed by the incorporation of the energy-harvesting fabric 602.

Figure 7:
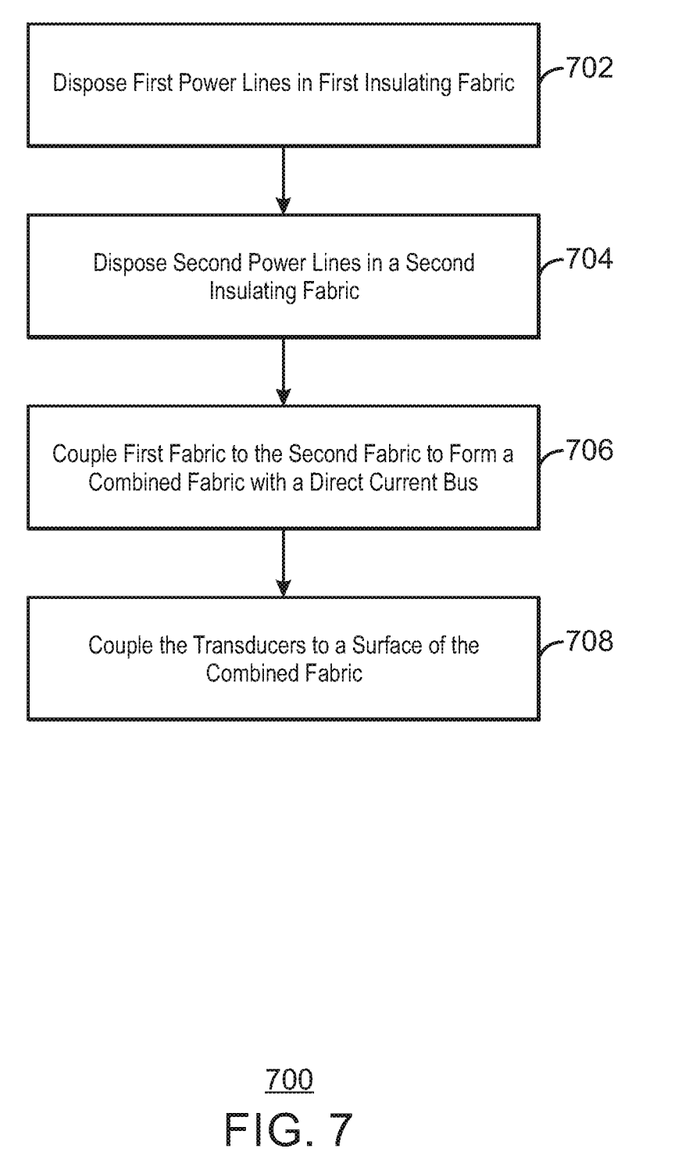
FIG. 7 is a diagram of an example method for generating an energy-harvesting fabric.

FIG. 7 is a diagram of an example method 700 for generating an energy-harvesting fabric, such as energy-harvesting fabrics 302 and 602. At block 702, a first set of power lines, such as positive power lines 310 are disposed with a grid pattern in a first fabric. The fabric is an insulating fabric. At block 704, a second set of power lines, such as negative power lines 312 are disposed with a grid pattern in a second insulating fabric.

At block 706, the first fabric is coupled to the second fabric to form a combined fabric with a direct current bus. The first and second insulating fabrics may be sewn together. Additionally, power lines, such as power lines 312, may be disposed in the first fabric to connect each transducer, such as transducers 306, to the negative power lines 312 in the second fabric.

At block 708, the transducers 306 may be coupled to a surface of the combined fabric. In this way, each transducer 306 is conductively coupled to the positive power lines and the negative power lines.

This process flow diagram is not intended to indicate that the blocks of the example method 700 are to be executed in any particular order, or that all of the blocks are to be included in every case. Further, any number of additional blocks not shown may be included within the example method 700, depending on the details of the specific implementation.

Figure 8:
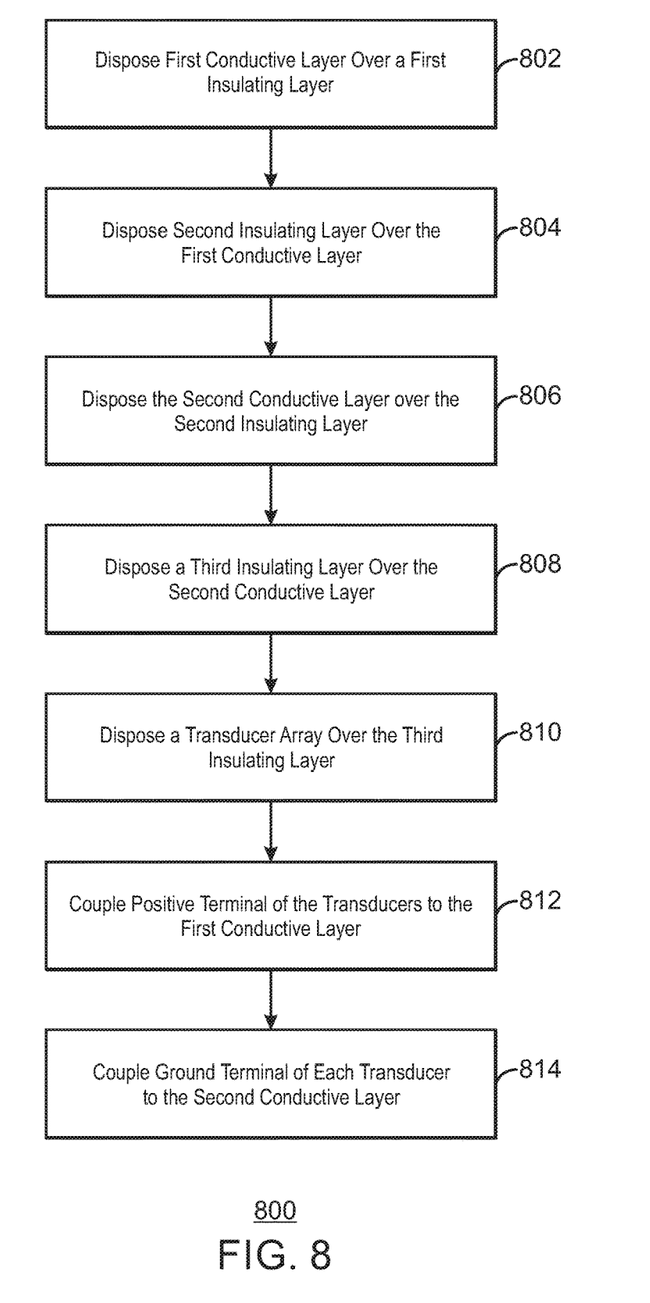
FIG. 8 is a diagram of an example method for generating an energy-harvesting fabric.

FIG. 8 is a diagram of an example method 800 for generating an energy-harvesting fabric, such as energy-harvesting fabrics 302 and 602. At block 802, a first conductive layer of fabric is disposed over a first insulating layer. The first conductive layer includes multiple holes to keep power lines of opposing polarity from contacting the first conductive layer and shorting the electrical circuit.

At block 804, a second insulating layer is disposed over the first conductive layer. The second insulating layer prevents contact between the first conductive layer and a second conductive layer disposed over the second insulating layer.

At block 806, the second conductive layer is disposed over the second insulating layer. Similar to the first conductive layer, the second conductive layer includes multiple holes that keep power lines of opposing polarity from contacting the first conductive layer. The holes in the second conductive layer are unaligned with the holes in the first conductive layer.

At block 808, a third insulating layer is disposed over the second conductive layer. The third insulating layer protects the second conductive layer from contact with other conductive materials.

At block 810, a transducer array is disposed over the third insulating layer. The transducer array may be of various types of transducers for harvesting ambient energy from sources that may be solar, thermal, electromagnetic, kinetic, and the like.

At block 812, a positive terminal of each of the transducers is coupled to the first conductive layer through positive power lines. These power lines pass between the transducers and the first conductive layers through the holes of the second conductive layer without contacting the second conductive layer.

At block 814, a ground terminal of each transducer is coupled to the second conductive layer with ground lines. Similar to the positive power lines, the ground lines pass between the transducers and the second conductive layer through holes of the first conductive layer without contacting the first conductive layer.

This process flow diagram is not intended to indicate that the blocks of the example method 800 are to be executed in any particular order, or that all of the blocks are to be included in every case. Further, any number of additional blocks not shown may be included within the example method 800, depending on the details of the specific implementation.

EXAMPLES

Example 1 includes an apparatus for harvesting energy includes a textile including an insulating substrate, a direct current (DC) power bus structure disposed in the insulating substrate, the DC power bus structure including a positive conductor and a ground conductor, and a plurality of transducers secured to the insulating substrate and in electrical contact with the positive conductor and the ground conductor, wherein the DC bus is configured to continuously conductively couple to one or more transducers in the textile.

Example 2 includes the apparatus of example 1, wherein the DC power bus structure is disposed in the insulating substrate by sewing a positive DC voltage thread into the insulating substrate, and sewing a grounding thread into the insulating substrate.

Example 3 includes the apparatus of example 2, wherein the positive DC voltage thread and the grounding thread are in electrical contact with positive and negative leads, respectively, of the transducers in the textile.

Example 4 includes the apparatus of example 1, wherein the DC power bus structure is disposed in the insulating substrate by disposing a first conductive layer of fabric between first and second layers of the insulating substrate, and disposing a second conductive layer of fabric between the second layer of the insulating substrate and a third layer of the insulating substrate.

Example 5 includes the apparatus of example 4, wherein a positive DC voltage thread is sewn between the first conductive layer and each of the transducers to create an electrical contact between the first conductive layer and the transducers, and wherein a grounding thread is sewn between the second conductive layer and each of the transducers to create an electrical contact between the second conductive layer and the transducers.

Example 6 includes the apparatus of example 5, wherein the first and second conductive layers include a plurality of holes.

Example 7 includes the apparatus of example 6, wherein the positive DC voltage thread passes through the holes of the second conductive layer isolated from the second conductive layer.

Example 8 includes the apparatus of example 6, wherein the grounding thread passes through the holes of the first conductive layer isolated from the first conductive layer.

Example 9 includes the apparatus of example 1, wherein the transducers include one or more of a photovoltaic panel, a rectenna, a thermoelectric generator, and a piezoelectric material.

Example 10 includes the apparatus of example 1. In some examples, the apparatus harvests energy.

Example 11 includes the apparatus of example 1. In some examples, the apparatus is separated into two or more pieces, and wherein at least one of the pieces includes an intact DC power bus segment, an intact transducer in electrical contact with the intact DC power bus segment. Additionally, the at least one piece harvests energy.

Example 12 includes an apparatus for harvesting energy includes an outer textile surrounding an inner textile, the inner textile including an insulating substrate, a direct current (DC) power bus structure disposed in the insulating substrate, the DC power bus structure including a positive conductor and a ground conductor, and a plurality of transducers secured to the insulating substrate and in electrical contact with the positive conductor and the ground conductor, wherein the DC bus is configured to continuously conductively couple to one or more transducers in the textile.

Example 13 includes the apparatus of example 12. In some examples, the DC power bus structure is disposed in the insulating substrate by sewing a positive DC voltage thread into the insulating substrate, and sewing a grounding thread into the insulating substrate.

Example 14 includes the apparatus of example 13. In some examples, the positive DC voltage thread and the grounding thread are in electrical contact with positive and negative leads, respectively, of the transducers remaining in the textile.

Example 15 includes the apparatus of example 12. In some examples, the DC power bus structure is disposed in the insulating substrate by disposing a first conductive layer of fabric between first and second layers of the insulating substrate, and disposing a second conductive layer of fabric between the second layer of the insulating substrate and a third layer of the insulating substrate.

Example 16 includes the apparatus of example 15. In some examples, a positive DC voltage thread is sewn between the first conductive layer and each of the transducers to create an electrical contact between the first conductive layer and the transducers, and wherein a grounding thread is sewn between the second conductive layer and each of the transducers to create an electrical contact between the second conductive layer and the transducers.

Example 17 includes the apparatus of example 16. In some examples, the first and second conductive layers include a plurality of holes, wherein the positive DC voltage thread passes through the holes of the second conductive layer isolated from the second conductive layer. Additionally, the grounding thread passes through the holes of the first conductive layer isolated from the first conductive layer.

Example 18 includes a method for generating an energy-harvesting fabric includes disposing a first conductive material with a first insulating fabric, disposing a second conductive material with a second insulating fabric, disposing a first power line in conductive contact with the first conductive material, to provide conductive contact for a positive lead of each of a plurality of transducers and, disposing a second power line in conductive contact with the second conductive material, to provide conductive contact for a ground of each of the transducers, and forming a direct current (DC) bus by combining the first and second insulating layers to insulate the first power lines and first conductive material from the second power lines and the second conductive material.

Example 19 includes the method of example 18, including disposing the positive lead of each of the transducers in conductive contact with the first power lines.

Example 20 includes the method of example 19, including disposing the ground of each of the transducers in conductive contact with the second power lines.

Example 21 includes an apparatus for harvesting energy includes a textile including an insulating substrate, a direct current (DC) power bus structure disposed in the insulating substrate, the DC power bus structure including a positive conductor and a ground conductor, and a plurality of transducers secured to the insulating substrate and in electrical contact with the positive conductor and the ground conductor. In some examples, the DC bus is configured to remain conductively coupled to one or more transducers remaining in the textile after the textile is cut to remove unused portions of the textile.

Example 22 includes the apparatus of example 21. In some examples, the DC power bus structure is disposed in the insulating substrate by sewing a positive DC voltage thread into the insulating substrate, and sewing a grounding thread into the insulating substrate.

Example 23 includes the apparatus of example 22. In some examples, the positive DC voltage thread and the grounding thread are in electrical contact with positive and negative leads, respectively, of the transducers remaining in the textile.

Example 24 includes the apparatus of examples 21 through 23, wherein the DC power bus structure is disposed in the insulating substrate by disposing a first conductive layer of fabric between first and second layers of the insulating substrate, and disposing a second conductive layer of fabric between the second layer of the insulating substrate and a third layer of the insulating substrate.

Example 25 includes the apparatus of example 24. In some examples, a positive DC voltage thread is sewn between the first conductive layer and each of the transducers to create an electrical contact between the first conductive layer and the transducers, and wherein a grounding thread is sewn between the second conductive layer and each of the transducers to create an electrical contact between the second conductive layer and the transducers.

Example 26 includes the apparatus of example 25. In some examples, the first and second conductive layers include a plurality of holes.

Example 27 includes the apparatus of example 26. In some examples, the positive DC voltage thread passes through the holes of the second conductive layer without contacting the second conductive layer.

Example 28 includes the apparatus of example 26. In some examples, the grounding thread passes through the holes of the first conductive layer without contacting the first conductive layer.

Example 29 includes the apparatus of example 21. In some examples, the transducers include one or more of a photovoltaic panel, a rectenna, a thermoelectric generator, and a piezoelectric material.

Example 30 includes the apparatus of examples 25 through 29, wherein the apparatus harvests energy.

Example 31 includes the apparatus of example 21. In some examples, the apparatus is cut into two or more pieces, and wherein at least one of the pieces includes an intact DC power bus segment, an intact transducer in electrical contact with the intact DC power bus segment. Additionally, the at least one piece harvests energy.

Example 32 includes an apparatus for harvesting energy includes an outer textile surrounding an inner textile, the inner textile including an insulating substrate, a direct current (DC) power bus structure disposed in the insulating substrate, the DC power bus structure including a positive conductor and a ground conductor, and a plurality of transducers secured to the insulating substrate and in electrical contact with the positive conductor and the ground conductor, wherein the DC bus is configured to remain conductively coupled to one or more transducers remaining in the textile after the textile is cut to remove unused portions of the textile.

Example 33 includes the apparatus of example 32. In some examples, the DC power bus structure is disposed in the insulating substrate by sewing a positive DC voltage thread into the insulating substrate, and sewing a grounding thread into the insulating substrate, wherein the positive DC voltage thread and the grounding thread are in electrical contact with positive and negative leads, respectively, of the transducers remaining in the textile.

Example 34 includes the apparatus of examples 32 or 33, wherein the DC power bus structure is disposed in the insulating substrate by disposing a first conductive layer of fabric between first and second layers of the insulating substrate; disposing a second conductive layer of fabric between the second layer of the insulating substrate and a third layer of the insulating substrate; sewing a positive DC voltage thread is sewn between the first conductive layer and each of the transducers to create an electrical contact between the first conductive layer and the transducers; and sewing a grounding thread between the second conductive layer and each of the transducers to create an electrical contact between the second conductive layer and the transducers, wherein the first and second conductive layers include a plurality of holes, wherein the positive DC voltage thread passes through the holes of the second conductive layer isolated from the second conductive layer. Additionally, the grounding thread passes through the holes of the first conductive layer isolated from the first conductive layer.

Example 35 includes a computer-readable medium for generating an energy-harvesting fabric, including executable instructions that, when executed by a processor, cause the processor to dispose a first conductive material with a first insulating fabric, dispose a second conductive material with a second insulating fabric, dispose a first power line in conductive contact with the first conductive material, to provide conductive contact for a positive lead of each of a plurality of transducers, dispose a second power line in conductive contact with the second conductive material, to provide conductive contact for a ground of each of the transducers, and form a direct current (DC) bus by combining the first and second insulating layers such that the first power lines and first conductive material are insulated from the second power lines and the second conductive material.

Example 36 includes the computer-readable medium of example 35, including instructions that cause the processor to dispose the positive lead of each of the transducers in conductive contact with the first power lines.

Example 37 includes the computer-readable medium of example 36, including instructions that cause the processor to dispose the ground of each of the transducers in conductive contact with the second power lines.

Example 38 includes the computer-readable medium of example 35. In some examples, combining the first and second insulating layers includes sewing a positive DC voltage thread in the insulating substrate, and sewing a grounding thread in the insulating substrate.

Example 39 includes the computer-readable medium of example 38. In some examples, the positive DC voltage thread and the grounding thread are in electrical contact with positive and negative leads, respectively, of the transducers remaining in the textile.

Example 40 includes the computer-readable medium of examples 38 or 39, wherein the DC power bus structure is disposed in the insulating substrate by disposing a first conductive layer of fabric between first and second layers of the insulating substrate, and disposing a second conductive layer of fabric between the second layer of the insulating substrate and a third layer of the insulating substrate.

Example 41 includes the computer-readable medium of example 35, including instructions that cause the processor to sew a positive DC voltage thread between the first conductive layer and each of the transducers to create an electrical contact between the first conductive layer and the transducers, and sew a grounding thread between the second conductive layer and each of the transducers to create an electrical contact between the second conductive layer and the transducers.

Example 42 includes the computer-readable medium of example 41. In some examples, the first and second conductive layers include a plurality of holes, wherein the positive DC voltage thread passes through the holes of the second conductive layer isolated from the second conductive layer. Additionally, the grounding thread passes through the holes of the first conductive layer isolated from the first conductive layer.

Example 43 includes an apparatus for harvesting energy includes means for disposing a first conductive material with a first insulating fabric, means for disposing a second conductive material with a second insulating fabric, means for disposing a first power line in conductive contact with the first conductive material, to provide conductive contact for a positive lead of each of a plurality of transducers and, means for disposing a second power line in conductive contact with the second conductive material, to provide conductive contact for a ground of each of the transducers, and means for forming a direct current (DC) bus by combining the first and second insulating layers such that the first power lines and first conductive material are insulated from the second power lines and the second conductive material.

Example 44 includes the apparatus of example 43 includes means for disposing the positive lead of each of the transducers in conductive contact with the first power lines, means for disposing the ground of each of the transducers in conductive contact with the second power lines.

Example 45 includes the apparatus of examples 43 or 44 includes means for sewing a positive DC voltage thread between the first conductive layer and each of the transducers to create an electrical contact between the first conductive layer and the transducers, and means for sewing a grounding thread between the second conductive layer and each of the transducers to create an electrical contact between the second conductive layer and the transducers. In some examples, the first and second conductive layers include a plurality of holes, wherein the positive DC voltage thread passes through the holes of the second conductive layer isolated from the second conductive layer. Additionally, the grounding thread passes through the holes of the first conductive layer isolated from the first conductive layer.

Example 46 includes an apparatus for harvesting energy includes a textile including an insulating substrate, a direct current (DC) power bus structure disposed in the insulating substrate, the DC power bus structure including a positive conductor and a ground conductor, and a plurality of transducers secured to the insulating substrate and in electrical contact with the positive conductor and the ground conductor, wherein the DC bus is configured to remain conductively coupled to one or more transducers remaining in the textile after the textile is cut to remove unused portions of the textile.

Example 47 includes the apparatus of example 46. In some examples, the DC power bus structure is disposed in the insulating substrate by sewing a positive DC voltage thread into the insulating substrate, and sewing a grounding thread into the insulating substrate.

Example 48 includes the apparatus of example 47. In some examples, the positive DC voltage thread and the grounding thread are in electrical contact with positive and negative leads, respectively, of the transducers remaining in the textile.

Example 49 includes the apparatus of example 46. In some examples, the DC power bus structure is disposed in the insulating substrate by disposing a first conductive layer of fabric between first and second layers of the insulating substrate, and disposing a second conductive layer of fabric between the second layer of the insulating substrate and a third layer of the insulating substrate.

Example 50 includes the apparatus of example 49. In some examples, a positive DC voltage thread is sewn between the first conductive layer and each of the transducers to create an electrical contact between the first conductive layer and the transducers, and wherein a grounding thread is sewn between the second conductive layer and each of the transducers to create an electrical contact between the second conductive layer and the transducers.

Example 51 includes the apparatus of example 50. In some examples, the first and second conductive layers include a plurality of holes.

Example 52 includes the apparatus of example 51. In some examples, the positive DC voltage thread passes through the holes of the second conductive layer isolated from the second conductive layer.

Example 53 includes the apparatus of example 51. In some examples, the grounding thread passes through the holes of the first conductive layer isolated from the first conductive layer.

Example 54 includes the apparatus of example 46. In some examples, the transducers include one or more of a photovoltaic panel, a rectenna, a thermoelectric generator, and a piezoelectric material.

Example 55 includes the apparatus of example 46. In some examples, the apparatus harvests energy.

Example 56 includes the apparatus of example 46. In some examples, the apparatus is separated into two or more pieces, and wherein at least one of the pieces includes an intact DC power bus segment, an intact transducer in electrical contact with the intact DC power bus segment. Additionally, the at least one piece harvests energy.

Example 57 includes an apparatus for harvesting energy includes an outer textile surrounding an inner textile, the inner textile including an insulating substrate, a direct current (DC) power bus structure disposed in the insulating substrate, the DC power bus structure including a positive conductor and a ground conductor, and a plurality of transducers secured to the insulating substrate and in electrical contact with the positive conductor and the ground conductor, wherein the DC bus is configured to remain conductively coupled to one or more transducers remaining in the textile after the textile is cut to remove unused portions of the textile.

Example 58 includes the apparatus of example 57. In some examples, the DC power bus structure is disposed in the insulating substrate by sewing a positive DC voltage thread into the insulating substrate, and sewing a grounding thread into the insulating substrate.

Example 59 includes the apparatus of example 58. In some examples, the positive DC voltage thread and the grounding thread are in electrical contact with positive and negative leads, respectively, of the transducers remaining in the textile.

Example 60 includes the apparatus of example 57. In some examples, the DC power bus structure is disposed in the insulating substrate by disposing a first conductive layer of fabric between first and second layers of the insulating substrate, and disposing a second conductive layer of fabric between the second layer of the insulating substrate and a third layer of the insulating substrate.

Example 61 includes the apparatus of example 60. In some examples, a positive DC voltage thread is sewn between the first conductive layer and each of the transducers to create an electrical contact between the first conductive layer and the transducers, and wherein a grounding thread is sewn between the second conductive layer and each of the transducers to create an electrical contact between the second conductive layer and the transducers.

Example 62 includes the apparatus of example 61. In some examples, the first and second conductive layers include a plurality of holes, wherein the positive DC voltage thread passes through the holes of the second conductive layer isolated from the second conductive layer.

Additionally, the grounding thread passes through the holes of the first conductive layer isolated from the first conductive layer.

Example 63 includes a method for generating an energy-harvesting fabric includes disposing a first conductive material with a first insulating fabric, disposing a second conductive material with a second insulating fabric, disposing a first power line in conductive contact with the first conductive material, to provide conductive contact for a positive lead of each of a plurality of transducers, disposing a second power line in conductive contact with the second conductive material, to provide conductive contact for a ground of each of the transducers, and forming a direct current (DC) bus by combining the first and second insulating layers such that the first power lines and first conductive material are insulated from the second power lines and the second conductive material.

Example 64 includes the method of example 63, including disposing the positive lead of each of the transducers in conductive contact with the first power lines.

Example 65 includes the method of example 64, including disposing the ground of each of the transducers in conductive contact with the second power lines.

Example 66 includes the method of example 63, including instructions that cause the processor to sew a positive DC voltage thread between the first conductive layer and each of the transducers to create an electrical contact between the first conductive layer and the transducers, and sew a grounding thread between the second conductive layer and each of the transducers to create an electrical contact between the second conductive layer and the transducers.

Example 67 includes the method of example 66. In some examples, the first and second conductive layers include a plurality of holes, wherein the positive DC voltage thread passes through the holes of the second conductive layer isolated from the second conductive layer. Additionally, the grounding thread passes through the holes of the first conductive layer isolated from the first conductive layer.

Example 68 includes the method of example 63. In some examples, the DC power bus structure is disposed in the insulating substrate by disposing a first conductive layer of fabric between first and second layers of the insulating substrate, and disposing a second conductive layer of fabric between the second layer of the insulating substrate and a third layer of the insulating substrate.

Example 69 includes the method of example 68. In some examples, a positive DC voltage thread is sewn between the first conductive layer and each of the transducers to create an electrical contact between the first conductive layer and the transducers, and wherein a grounding thread is sewn between the second conductive layer and each of the transducers to create an electrical contact between the second conductive layer and the transducers.

Example 70 includes the method of example 69. In some examples, the first and second conductive layers include a plurality of holes, wherein the positive DC voltage thread passes through the holes of the second conductive layer isolated from the second conductive layer. Additionally, the grounding thread passes through the holes of the first conductive layer isolated from the first conductive layer.

Example 71 includes an apparatus (102, 202, 204, 206, 208, 210, 402, 602) for harvesting energy includes a textile including an insulating substrate (314. 618), a direct current (DC) power bus structure (304, 404) disposed in the insulating substrate (314. 618), the DC power bus structure (304, 604) including a positive conductor (310, 610) and a ground conductor (312, 612), and a plurality of transducers (104, 306, 406) secured to the insulating substrate (314. 618) and in electrical contact with the positive conductor (310, 610) and the ground conductor (312, 612), wherein the DC bus is configured to remain conductively coupled to one or more transducers (104, 306, 406) remaining in the textile after the textile is cut to remove unused portions of the textile.

Example 72 includes the apparatus (102, 202, 204, 206, 208, 210, 402, 602) of example 71. In some examples, the DC power bus structure (304, 604) is disposed in the insulating substrate (314. 618) by sewing a positive DC voltage thread into the insulating substrate (314. 618), and sewing a grounding thread into the insulating substrate (314. 618), wherein the positive DC voltage thread and the grounding thread are in electrical contact with positive and negative leads, respectively, of the transducers (104, 306, 406) remaining in the textile.

Example 73 includes the apparatus (102, 202, 204, 206, 208, 210, 402, 602) of examples 71 or 72, wherein the DC power bus structure (304, 604) is disposed in the insulating substrate (314. 618) by disposing a first conductive layer of fabric between first and second layers of the insulating substrate (314. 618), and disposing a second conductive layer of fabric between the second layer of the insulating substrate (314. 618) and a third layer of the insulating substrate (314. 618), wherein a positive DC voltage thread is sewn between the first conductive layer and each of the transducers (104, 306, 406) to create an electrical contact between the first conductive layer and the transducers (104, 306, 406), wherein a grounding thread is sewn between the second conductive layer and each of the transducers (104, 306, 406) to create an electrical contact between the second conductive layer and the transducers (104, 306, 406), wherein the first and second conductive layers include a plurality of holes. Additionally, the positive DC voltage thread passes through the holes of the second conductive layer isolated from the second conductive layer. Additionally, the grounding thread passes through the holes of the first conductive layer isolated from the first conductive layer.

Example 74 includes an apparatus (202, 204, 206, 208, 210) for harvesting energy includes an outer textile surrounding an inner textile, the inner textile including an insulating substrate (314. 618), a direct current (DC) power bus structure disposed in the insulating substrate (314. 618), the DC power bus including a positive conductor and a ground conductor, and a plurality of transducers (104, 306, 406) secured to the insulating substrate (314. 618) and in electrical contact with the positive conductor and the ground conductor, wherein the DC bus is configured to remain conductively coupled to one or more transducers (104, 306, 406) remaining in the textile after the textile is cut to remove unused portions of the textile.

Example 75 includes a computer-readable medium for generating an energy-harvesting fabric (102, 402, 602), including executable instructions that, when executed by a processor, cause the processor to dispose a first conductive material with a first insulating fabric, dispose a second conductive material with a second insulating fabric, dispose a first power line in conductive contact with the first conductive material, to provide conductive contact for a positive lead of each of a plurality of transducers (104, 306, 406), dispose a second power line in conductive contact with the second conductive material, to provide conductive contact for a ground of each of the transducers (104, 306, 406), and form a direct current (DC) bus by combining the first and second insulating layers such that the first power lines and first conductive material are insulated from the second power lines and the second conductive material.

Example 76 includes the computer-readable medium of example 75, including instructions that cause the processor to dispose the positive lead of each of the transducers (104, 306, 406) in conductive contact with the first power lines.

Example 77 includes the computer-readable medium of example 76, including instructions that cause the processor to dispose the ground of each of the transducers (104, 306, 406) in conductive contact with the second power lines.

Example 78 includes the computer-readable medium of example 75. In some examples, combining the first and second insulating layers includes sewing a positive DC voltage thread in the insulating substrate (314. 618), and sewing a grounding thread in the insulating substrate (314. 618).

Example 79 includes the computer-readable medium of example 78. In some examples, the positive DC voltage thread and the grounding thread are in electrical contact with positive and negative leads, respectively, of the transducers (104, 306, 406) remaining in the textile.

Example 80 includes the computer-readable medium of examples 75 through 79, wherein the DC power bus structure (304, 604) is disposed in the insulating substrate (314. 618) by disposing a first conductive layer of fabric between first and second layers of the insulating substrate (314. 618), and disposing a second conductive layer of fabric between the second layer of the insulating substrate (314. 618) and a third layer of the insulating substrate (314. 618).

Example 81 includes the computer-readable medium of example 75, including instructions that cause the processor to sew a positive DC voltage thread between the first conductive layer and each of the transducers (104, 306, 406) to create an electrical contact between the first conductive layer and the transducers (104, 306, 406), and sew a grounding thread between the second conductive layer and each of the transducers (104, 306, 406) to create an electrical contact between the second conductive layer and the transducers (104, 306, 406).

Example 82 includes the computer-readable medium of example 81. In some examples, the first and second conductive layers include a plurality of holes, wherein the positive DC voltage thread passes through the holes of the second conductive layer isolated from the second conductive layer.

Additionally, the grounding thread passes through the holes of the first conductive layer isolated from the first conductive layer.

Example 83 includes an apparatus for harvesting energy includes means for disposing a first conductive material with a first insulating fabric, means for disposing a second conductive material with a second insulating fabric, means for disposing a first power line in conductive contact with the first conductive material, to provide conductive contact for a positive lead of each of a plurality of transducers (104, 306, 406), means for disposing a second power line in conductive contact with the second conductive material, to provide conductive contact for a ground of each of the transducers (104, 306, 406), and means for forming a direct current (DC) bus by combining the first and second insulating layers such that the first power lines and first conductive material are insulated from the second power lines and the second conductive material.

Example 84 includes the apparatus of example 83 includes means for disposing the positive lead of each of the transducers (104, 306, 406) in conductive contact with the first power lines, means for disposing the ground of each of the transducers (104, 306, 406) in conductive contact with the second power lines.

Example 85 includes the apparatus of examples 83 or 84 includes means for sewing a positive DC voltage thread between the first conductive layer and each of the transducers (104, 306, 406) to create an electrical contact between the first conductive layer and the transducers (104, 306, 406), and means for sewing a grounding thread between the second conductive layer and each of the transducers (104, 306, 406) to create an electrical contact between the second conductive layer and the transducers (104, 306, 406). In some examples, the first and second conductive layers include a plurality of holes, wherein the positive DC voltage thread passes through the holes of the second conductive layer isolated from the second conductive layer. Additionally, the grounding thread passes through the holes of the first conductive layer isolated from the first conductive layer.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for harvesting energy, comprising:
    a textile comprising an insulating substrate;
    a direct current (DC) power bus structure disposed in the insulating substrate, the DC power bus comprising a positive conductor and a ground conductor; and a plurality of transducers secured to the insulating substrate and in electrical contact with the positive conductor and the ground conductor, wherein the DC bus is configured to continuously conductively couple to one or more transducers in the textile.

2. The apparatus of claim 1, wherein the DC power bus structure comprises:
a positive DC voltage thread sewed into the insulating substrate; and
a grounding thread sewed into the insulating substrate.

3. The apparatus of claim 2, wherein the positive DC voltage thread and the grounding thread are in electrical contact with positive and negative leads, respectively, of the transducers in the textile.

4. The apparatus of claim 1, wherein the DC power bus structure comprises:
a first conductive layer of fabric disposed between first and second layers of the insulating substrate; and
a second conductive layer of fabric disposed between the second layer of the insulating substrate and a third layer of the insulating substrate.

5. The apparatus of claim 4, wherein a positive DC voltage thread is sewn between the first conductive layer and each of the transducers to create an electrical contact between the first conductive layer and the transducers, and wherein a grounding thread is sewn between the second conductive layer and each of the transducers to create an electrical contact between the second conductive layer and the transducers.

6. The apparatus of claim 5, wherein the first and second conductive layers comprise a plurality of holes.

7. The apparatus of claim 6, wherein the positive DC voltage thread passes through the holes of the second conductive layer isolated from the second conductive layer.

8. The apparatus of claim 6, wherein the grounding thread passes through the holes of the first conductive layer isolated from the first conductive layer.

9. The apparatus of claim 1, wherein the transducers comprise one or more of:
a photovoltaic panel;
a rectenna;
a thermoelectric generator; and
a piezoelectric material.

10. The apparatus of claim 1, wherein the apparatus harvests energy.

11. The apparatus of claim 1, wherein the apparatus is separated into two or more pieces, and wherein at least one of the pieces comprises an intact DC power bus segment, an intact transducer in electrical contact with the intact DC power bus, and wherein the at least one piece harvests energy.

12. An apparatus for harvesting energy, comprising:
an outer textile surrounding an inner textile, the inner textile comprising:
an insulating substrate;
a direct current (DC) power bus structure disposed in the insulating substrate, the DC power bus comprising a positive conductor and a ground conductor; and
a plurality of transducers secured to the insulating substrate and in electrical contact with the positive conductor and the ground conductor, wherein the DC bus is configured to continuously conductively couple to one or more transducers in the textile.

13. The apparatus of claim 12, wherein the DC power bus comprises:
a positive DC voltage thread sewed into the insulating substrate; and
a grounding thread sewed into the insulating substrate.

14. The apparatus of claim 13, wherein the positive DC voltage thread and the grounding thread are in electrical contact with positive and negative leads, respectively, of the transducers in the textile.

15. The apparatus of claim 12, wherein the DC power bus structure comprises:
a first conductive layer of fabric disposed between first and second layers of the insulating substrate; and
a second conductive layer of fabric disposed between the second layer of the insulating substrate and a third layer of the insulating substrate.

16. The apparatus of claim 15, wherein a positive DC voltage thread is sewn between the first conductive layer and each of the transducers to create an electrical contact between the first conductive layer and the transducers, and wherein a grounding thread is sewn between the second conductive layer and each of the transducers to create an electrical contact between the second conductive layer and the transducers.

17. The apparatus of claim 16, wherein the first and second conductive layers comprise a plurality of holes, wherein the positive DC voltage thread passes through the holes of the second conductive layer isolated from the second conductive layer, and wherein the grounding thread passes through the holes of the first conductive layer isolated from the first conductive layer.

18. A method for generating an energy-harvesting fabric, comprising:
disposing a first conductive material with a first insulating fabric;
disposing a second conductive material with a second insulating fabric;
disposing a first power line in conductive contact with the first conductive material, to provide conductive contact for a positive lead of each of a plurality of transducers and;
disposing a second power line in conductive contact with the second conductive material, to provide conductive contact for a ground of each of the transducers and
forming a direct current (DC) bus by combining the first and second insulating fabrics to insulate the first power line and first conductive material from the second power line and the second conductive material.

19. The method of claim 18, comprising disposing the positive lead of each of the transducers in conductive contact with the first power line.

20. The method of claim 19, comprising disposing the ground of each of the transducers in conductive contact with the second power line.

* * * * *